United States Patent [19]

Takanashi et al.

[11] Patent Number: 4,620,221
[45] Date of Patent: Oct. 28, 1986

[54] COLOR IMAGING APPARATUS WITH COMPENSATION FOR BEAM DEFLECTION NONLINEARITY

[75] Inventors: Itsuo Takanashi, Yokohama; Shintaro Nakagaki, Fujisawa; Hiroshi Ichimura, Tokyo; Takashi Kuriyama, Tokyo; Ichiro Negishi, Tokyo, all of Japan

[73] Assignee: Victor Company of Japan, Limited, Yokohama, Japan

[21] Appl. No.: 582,226

[22] Filed: Feb. 21, 1984

[30] Foreign Application Priority Data

Feb. 22, 1983 [JP] Japan .................. 58-28332

[51] Int. Cl.⁴ .................. H04N 9/083; H04N 9/07
[52] U.S. Cl. ............................. 358/47; 358/44
[58] Field of Search ............. 358/44, 40, 41, 43, 358/45, 46, 47, 67, 217

[56] References Cited

U.S. PATENT DOCUMENTS

| 3,755,620 | 8/1973 | McMann | 358/45 |
| 3,939,486 | 2/1976 | Tomii | 358/46 |
| 4,163,250 | 7/1979 | Tomii et al. | 358/45 |
| 4,185,296 | 1/1980 | Nishikawa et al. | 358/45 |
| 4,305,022 | 12/1981 | Mitamura et al. | 358/67 |

FOREIGN PATENT DOCUMENTS

34854 9/1978 Japan .
201395 12/1982 Japan .................. 358/43

Primary Examiner—James J. Groody
Assistant Examiner—Randall S. Svihla
Attorney, Agent, or Firm—Cushman, Darby & Cushman

[57] ABSTRACT

In a single-tube color imaging apparatus, the pickup tube includes a photoelectrical conversion target and a filter having recurrent groups of different color stripes through which an optical image is passed to the target. The target is scanned by an electron beam to produce a video signal having a frequency inversely proportional to the intervals at which the recurrent groups are arranged. The video signal varies in phase with the relative values of primary color components contained in the image passing through the stripes of each group and in amplitude with the intensity of the primary color components. Prior to normal operation, the target is uniformly illuminated with light of a predetermined color to generate a reference video signal, which is stored in a field memory. During normal operation, the reference signal is repeatedly read out of the memory and compared by frequency and phase comparators with the video signal from the target. Frequency and phase control circuitry responds to the outputs of the comparators by controlling the frequency and phase relationships between the two signals so that they match in frequency and phase before being applied to synchronous detectors.

19 Claims, 15 Drawing Figures

COLOR IMAGING APPARATUS WITH COMPENSATION FOR BEAM DEFLECTION NONLINEARITY

BACKGROUND OF THE INVENTION

The present invention relates to a single-tube color television image pickup apparatus having a frame memory in which the beam deflection system's nonlinearity information is stored as a reference signal for synchronous detection of primary colors.

In single-tube color television image pickup apparatus, a color filter is affixed to the photoelectrical conversion target of the image pickup tube to optically modulate a color image focused thereon and generate a color multiplexed video signal from the target.

Various proposals have been made in the arrangement of color filter stripes and in the circuit configuration that enables detection of the primary color components from the multiplexed video signal. One such color filter comprises a plurality of successively arranged, recurrent groups of filter stripes of different colors. The color-multiplexed signal has a frequency inversely proportional to the intervals at which the recurrent groups of the stripes are arranged. The signal varies in phase with the relative values of the primary color components contained in the color image passing through the stripes of each group and in amplitude with the intensity of the primary color components. In a known image pickup system a pair of synchronous detectors are provided to detect two of the primary color components from such multiplexed signal synchronously with a reference signal whose frequency is equal to the carrier frequency of the multiplexed signal.

One shortcoming inherent in the synchronous detection system is that the nonlinearity of the vertical and horizontal deflection signals causes the carrier frequency of the multiplexed video signal to deviate from the frequency of the reference signal.

To overcome this nonlinearity problem, a color image pickup apparatus, as shown and described in Japanese Examined Patent Publication (Kokoku) No. 53-34854, includes a frame memory. Prior to image pickup operation, the tube's target is uniformly illuminated with light of a predetermined primary color and is scanned with a beam which is subject to the inherent nonlinearity of the deflection signals. The video output derived from this illumination is stored in the memory as the reference signal for the synchronous detectors. During image pickup operation, the stored information is repeatedly read out of the memory to synchronously detect the primary color components. Since the frequency of the stored reference signal varies as a function of the nonlinearity, the reference signal and video signal match in frequency and phase with each other at the inputs of the synchronous detectors.

However, the prior art system is still subject to deflection signal variations which arise from instabilities in the deflection system and is also subject to noise arising from electromagnetic interference from external circuits. Such disturbing factors cause beam-spot size and scanning speed variations which result in a frequency difference between the video signal and the reference signal.

SUMMARY OF THE INVENTION

Accordingly, an object of the present invention is to provide a color image pickup apparatus of the synchronous detection type which maintains frequency match between the video signal and the reference signal under varying operating parameters including the nonlinearity of the deflection signals and their variations.

This object is obtained by detecting the frequency deviation of the video signal from the stored reference signal that occurs at a rate which reflects the beam's nonlinearity and controlling their frequency relationship so that the frequency deviation reduces substantially to zero.

In the color image pickup apparatus of the present invention, an image is focused on a photoelectrical conversion target of an image pickup tube through a color stripe filter and converted to an electrostatic image which is scanned in raster form by an electron beam under the control of a deflection system in response to horizontal and vertical sync pulses to generate a video signal. The color stripe filter comprises a plurality of recurrent groups of color stripes of different colors successively arranged at periodic intervals so that the video signal comprises a carrier modulated in amplitude and phase with the color image, the frequency of the carrier corresponding to the spatial frequency of the color filter. To compensate for the nonlinear of beam deflection signals a field memory is provided to store a reference video signal of a predetermined color having a frequency affected by the nonlinearity of the deflection system. A memory control circuit writes the reference video signal into the memory during a write-in mode and repeatedly reads it from the memory during a read-out mode to serve as a reference frequency signal which is supplied to a pair of synchronous detectors in a predetermined phase relationship and combined synchronously with the video signal to detect primary color signals.

To compensate for variations and noise in the deflection signals the apparatus includes a frequency comparator which detects the frequency difference between the reference frequency signal and the video signal. Their frequency relationship is controlled in response to the detected frequency difference to reduce the frequency difference substantially to zero.

A phase deviation between the video signal and the reference frequency signal is preferably detected to control their phase relationship so that the phase difference reduces substantially to zero. This phase correction may be effected by sensing the leading edge of the video line output and resetting a variable frequency oscillator, or effected by continuously monitoring the phase difference and introducing a phase shift to one of these signals in accordance with the monitored phase difference.

BRIEF DESCRIPTION OF THE DRAWINGS

The present invention will be described in further detail with reference to the accompanying drawings, in which.

DETAILED DESCRIPTION

Figure 1:
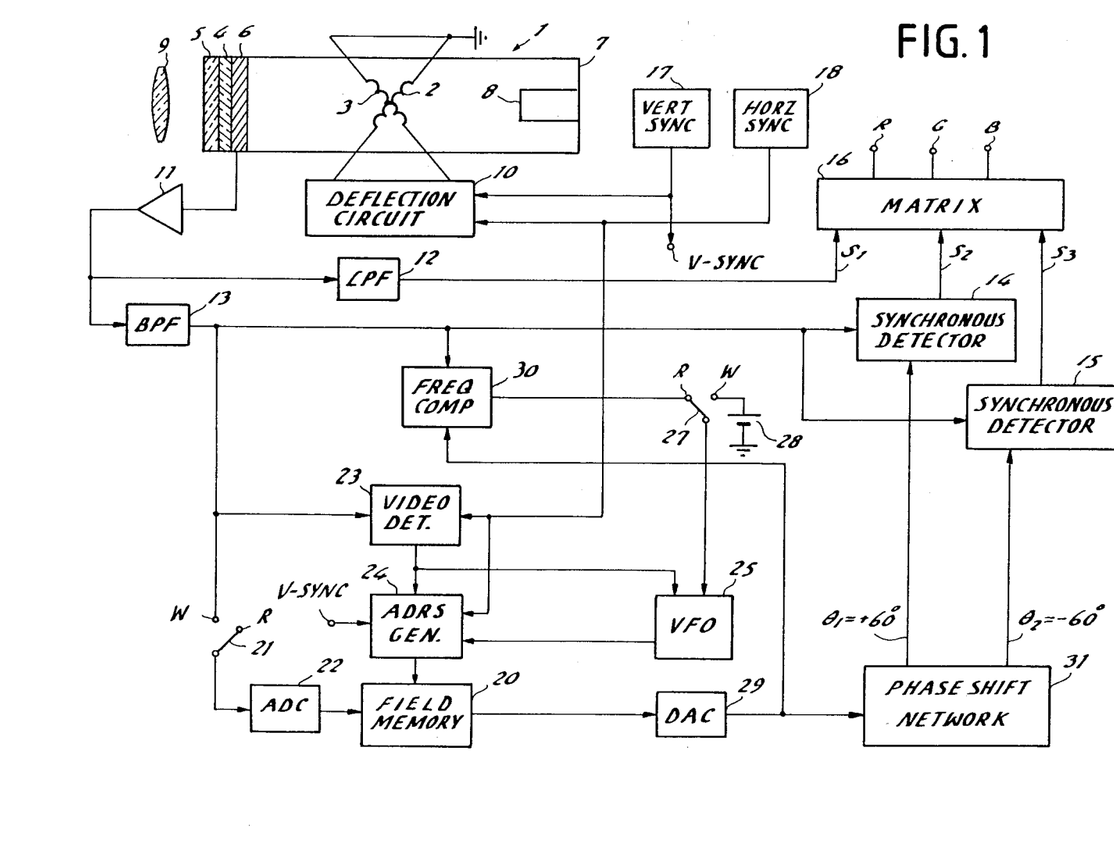
FIG. 1 is a block diagram of a first preferred embodiment of the present invention.

Referring now to FIG. 1, there is shown a color television pickup apparatus according to a preferred embodiment of the present invention. The apparatus includes a color television pickup tube 1 having a pair of vertical and horizontal deflection yokes 2 and 3, a color stripe filter 4 affixed to the rear side of a transparent faceplate 5 of an evacuated envelope 7, a photoelectrical conversion target 6 attached to the rear of the filter 4 to be scanned by an electron beam emitted from an electron gun 8. A lens 9 focuses an object scene on the surface of the target 6 through the color filter 4. A video signal is read from the photoconductive layer of the conversion target 6.

Figure 2:
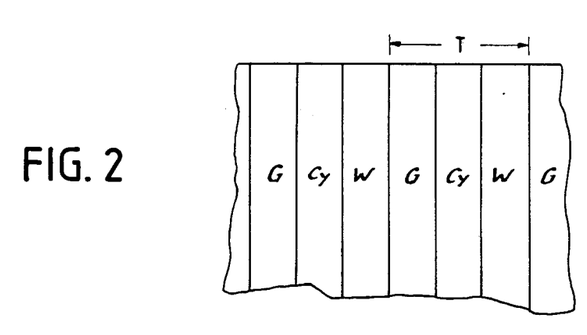
FIGS. 2 and 3 are illustrations of color stripe filters.

An example of the color filter 4 is illustrated in FIG. 2. This filter comprises a plurality of recurrent groups of green (G), cyan (Cy) and transparent (W) stripes having equal width extending vertically throughout the target 6 and successively arranged across the horizontal dimension of the target 6 with the color stripes of each group recurring at intervals T. The filter 4 has therefore a spatial frequency inversely proportional to the periodic interval T. Light passing through the color filter 4 is optically modulated by the striped color pattern to develop an electrostatic image which is read by the electron beam. A rectangular raster scan is provided by the horizontal and vertical yokes 2 and 3 energized by sweep currents supplied from a deflection circuit 10 in response to vertical and horizontal sync pulses from vertical and horizontal sync generators 17 and 18.

Figure 3:
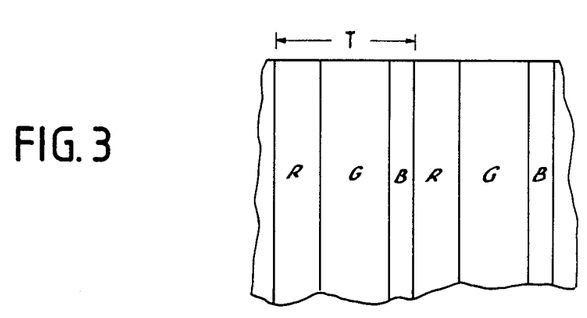

As shown in FIG. 3, the color filter 4 may also comprise recurrent groups of red, green and blue color stripes having different widths with the green stripes having the greatest width and the blue stripes having the least width width.

Figure 4:
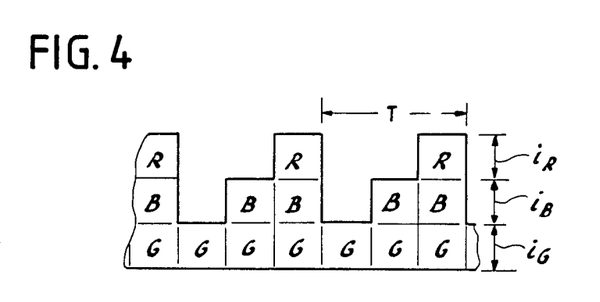
FIG. 4 is a waveform diagram associated with the color filter of FIG. 2.

For purposes of illustration, the color filter of the type shown in FIG. 2 is employed. As the electron beam scans the target 6, an electrostatic image is sequentially discharged, producing a color-multiplexed video signal having a frequency inversely proportional to the interval T, which signal varies in phase with the relative values of primary color components of light passing through the stripes of each group and in amplitude with the intensity of the primary color components. More specifically, the light incident on the green stripes is removed of its red and blue components and its green component passes to the target, while the light incident on the cyan stripes is removed of the red component so that its green and blue components pass to the target. Therefore, if the target is illuminated with an imagewise radiation of white light (equal energies at all wavelengths throughout the visible spectrum), a series of waveforms is generated with each waveform containing (G), (B+G) and (R+B+G) components attributed respectively to green (G), cyan (Cy) and transparent (W) stripes as illustrated in FIG. 4. Therefore, the video signal S obtained from the target 6 is given by:

$$S = (i_G + (\tfrac{2}{3})i_B + (\tfrac{1}{3})i_R) + A \sin(\psi t + \psi) + \ldots \quad (1)$$

where, $$A = -(\sqrt{3}/\pi)(i_B^2 + i_B i_R + i_R^2)^{\frac{1}{2}} \ldots (1')$$
$$\psi = \tan^{-1}(i_B - i_R)/\sqrt{3}(i_B + i^R)$$
$$\omega = 2\pi/T = 2\pi f \text{ (where f represents the spatial frequency of the color filter (4).}$$

The color signal S is amplified by a preamplifier 11 and applied to a low-pass filter 12 and to a band-pass filter 13. As given by Equation 1, the signal S contains a DC or luminance signal given by:

$$S_1 = i_G + (\tfrac{2}{3})i_B + (\tfrac{1}{3})i_R \ldots \quad (2)$$

which is obtained from the output of low-pass filter 12 and a high frequency signal whose fundamental frequency component $A \sin(\omega t + \psi)$ is obtained at the output of band-pass filter 13. The output of band-pass filter 13 is applied to a pair of synchronous detectors 14 and 15 to which are also applied reference signals $\sin(\omega t + \theta_1)$ and $\sin(\omega t + \theta_2)$ which are derived from a feedback controlled circuit to be described in detail later to generate signals $S_2$ and $S_3$ given as follows:

$$S_2 = A \sin(\omega t + \psi) \sin(\omega t + \theta_1) \ldots \quad (3)$$

$$S_3 = A \sin(\omega t + \psi) \sin(\omega t + \theta_2) \ldots \quad (4)$$

It is seen that the color formation passing through the color filter modulates the amplitude and phase of a carrier having a frequency f which is inversely proportional to the interval T of the color stripe filter 4. If $\theta_1$ and $\theta_2$ are set equal to $+60°$ and $-60°$, respectively, the output signals $S_2$ and $S_3$ of the synchronous detectors are derived from Equations (1'), (3) and (4) as given by:

$$S_2 = a \times i_R \ldots \quad (5)$$

$$S_3 = b \times i_B \ldots \quad (6)$$

where a and b are constants.

The luminance signal $S_1$ and color signals $S_2$ (red) and $S_3$ (blue) are fed to a known matrix circuit 16 and converted to red, green and blue primary color signals R, G and B.

To compensate for the nonlinearity inherent in the deflection waveforms generated by the deflection circuit 10, the apparatus includes a field memory 20 in which is stored information on the nonlinearity of the deflection system. This information is written in a write-in mode prior to the normal operation of the apparatus by uniformly illuminating the target 6 with a radiation of a predetermined primary color to generate a constant-amplitude reference color video signal of a frequency which varies as a function of the nonlinearity of the deflection system. Manually operated switches 21 and 27 are switched to the write position in the write-in mode to apply the output of band-pass filter 13 to an analog-to-digital converter 22. A reference control voltage is also applied from a reference voltage source 28 to a variable frequency pulse oscillator 25 of the type wherein oscillation is reset to a predetermined phase in response to a reset signal applied thereto. A voltage-controlled oscillator is suitable for this application. In the write-in mode the oscillator 25 is held at a constant value and the clock pulse is generated at a constant frequency. The reference color video signal is sampled by the AD converter 22 at an appropriate rate, the sampled value being converted to a digital code for delivery to the field memory 20.

A video carrier detector 23 is provided which essentially comprises a D-type positive edge-triggered flip-flop having its clock input coupled to the output of band-pass filter 13 and its clear input coupled to the horizontal sync generator 18 with the D input and preset input terminals being grounded. The video carrier detector 23 detects the leading edge of the output of the band-pass filter 13 that occurs at every line scan to generate an enable signal which lasts until this flip-flop is reset by a subsequent horizontal sync pulse. This enable signal is applied to an address generator 24 to initiate the generation of an address code and is applied to the variable frequency oscillator 25 as a phase resetting signal to reset it at the leading edge of the enable signal to a predetermined phase. The address generator 24 also receives the vertical and horizontal sync pulses from sync generators 17, 18 and the clock pulses from the oscillator 25 to generate an address code which specifies the storage cell in a matrix pattern of the frame memory 20. Storage cells in a given row are specified by bits which are incremented in response to the horizontal sync and those in each row are addressed by bits which are incremented in response to the clock pulse. The address code is reset in response to the vertical sync pulse.

During the write-in mode, the reference video signal, which is digitized by the analog-to-digital converter 22, is written into the field memory 20 at a constant rate determined by the reference control voltage from the voltage source 28. Once the reference signal of a field period has been stored in the memory 20, the switches 21 and 27 are switched to the read terminal R.

During a read-out mode, the stored reference signal is read out of the memory in a nondestructive manner into a digital-to-analog converter 29 in response to an enable signal from the video carrier detector 23. During the readout mode, the pulse generator 25 derives its frequency control voltage from the output of a frequency comparator 30. The frequency comparator 30 compares the video signal frequency with the output frequency of the DA converter 29 to detect the frequency difference therebetween. The frequency of the clock pulse supplied to the address generator 24 is thus controlled so that the frequency difference reduces towards zero. Since the variable frequency oscillator 25 is reset to a predetermined phase at the leading edge of the video line signal, the reference signal from the memory is also in phase with the video signal.

In this way, the field memory 20 is read synchronously with the actual beam scanning speed of the pickup tube 1. As a result, the nonlinearity of beam deflection signals and the variations in the deflection signals due to instability of deflection circuit and yokes are effectively compensated.

The output of the DA converter 29 is also applied to a phase shift network 31 which provides a first phase-shifted reference signal having a phase shift of 60 degrees with respect to the DA converter 29 output and a second phase-shifted reference signal having a phase shift of −60 degrees with respect to the DA converter output. These reference signals have therefore phase differences of +60 and −60 degrees with respect to the color video signal passing through band-pass filter 13, and are applied to the synchronous detectors 14 and 15, respectively, to provide synchronous detection of the primary color signals.

Figure 5:
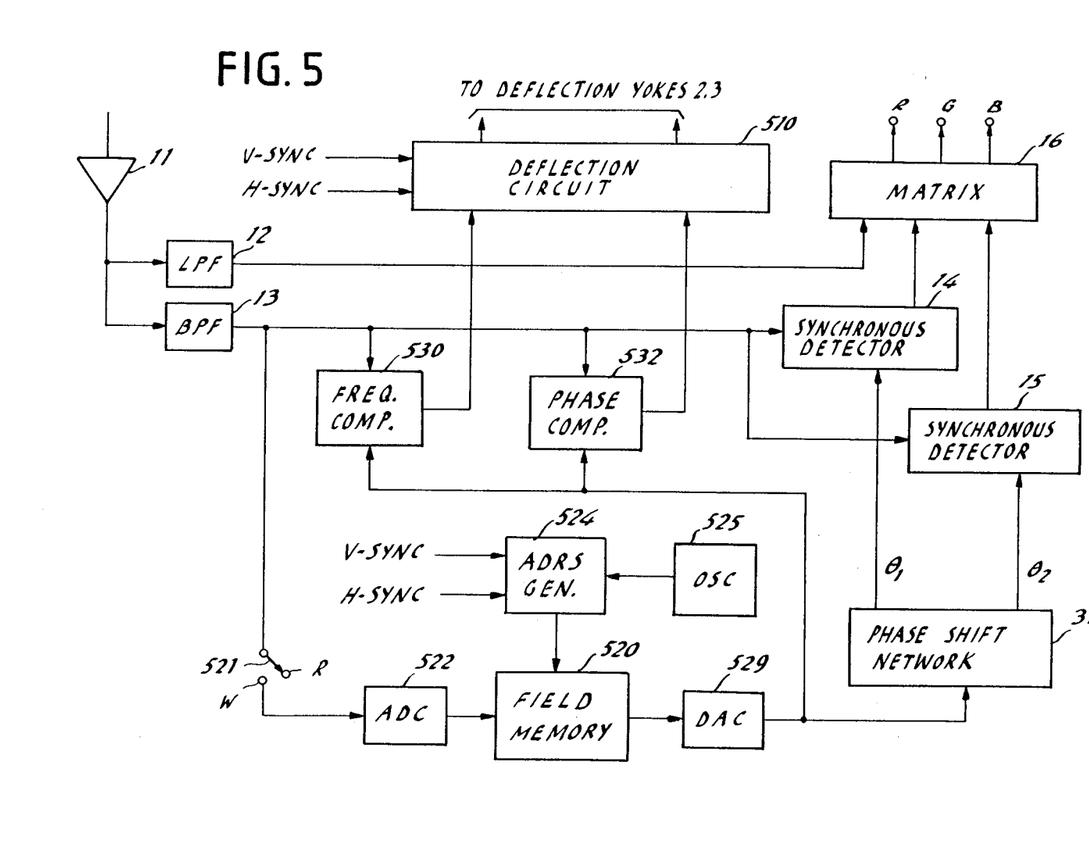
FIG. 5 is a block diagram of a second preferred embodiment of the present invention.

FIG. 5 is an illustration of a second preferred embodiment of the invention which differs from the previous embodiment in that the frequency and phase match is provided by controlling the electron beam while effecting the memory readout operation at a constant frequency. A constant frequency oscillator 525 supplies constant-frequency clock pulses to address generator 524 to generate address codes whose row address information is updated in response to the horizontal sync pulse as in the previous embodiment. Field memory 520 is addressed at a constant rate during readout operation of a given line and therefore the output signal from DA converter 529 contains a component which is affected by the deflection signal variations. A phase comparator 532 is provided to detect a phase deviation of the video signal from the output of DA converter 529. The output signal from the phase comparator 532 indicates the amount of deviation of the beam from the intended path of the scan as a result of the deflection system's instability. Frequency comparator 530 provides a frequency deviation signal indicating the variation in the deflection waveforms resulting from the instability. The output signals from the frequency comparator 530 and phase comparator 532 are applied to a deflection circuit 510.

Figure 6:
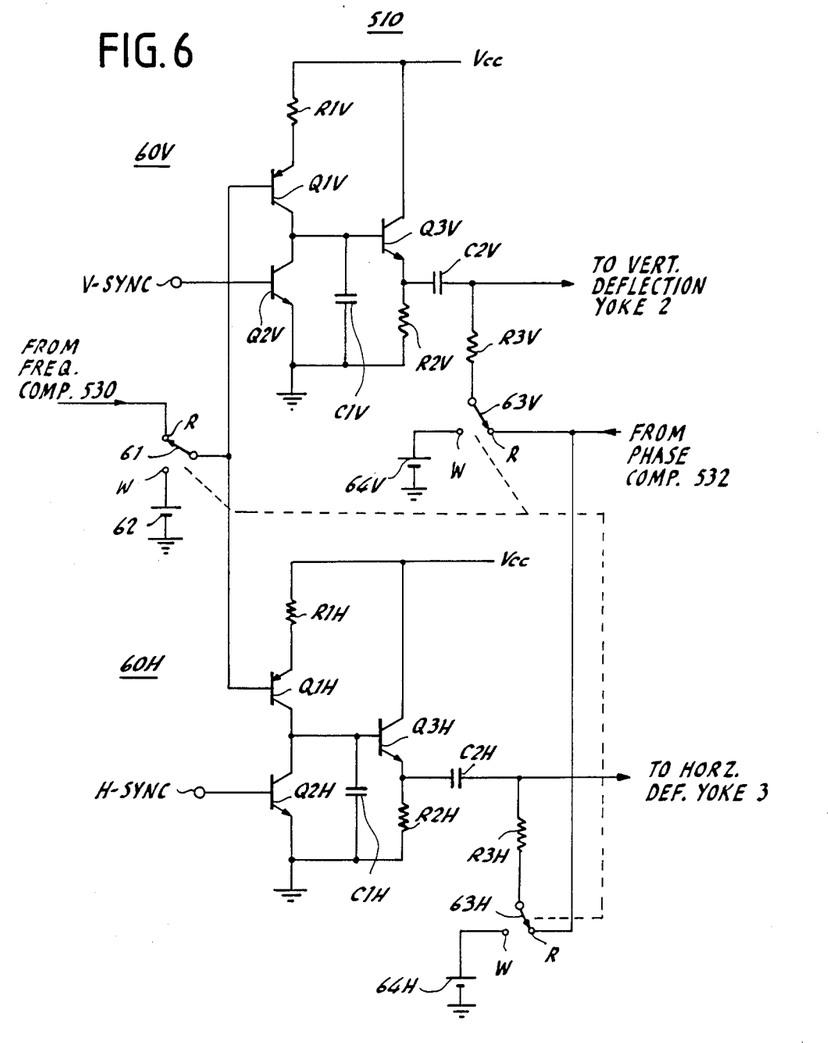
FIG. 6 is a circuit diagram of the deflection circuit of FIG. 5.

As shown in detail in FIG. 6, the deflection circuit 510 comprises a vertical deflection circuit 60V and a horizontal deflection circuit 60H of identical construction with different circuit parameters. Each of the deflection circuits includes a constant current source formed by a resistor R1 and a transistor Q1 connected in a series circuit with a switching transistor Q2 from a voltage supply Vcc to ground. The bases of transistors Q1V and Q1H are coupled together to a moving contact arm of a manually operated switch 61 and the bases of transistors Q2V and Q2H are biased by vertical and horizontal sync pulses, respectively. The read-write switch has a write terminal W impressed with a reference voltage by a voltage source 62 and a read terminal R to which the output of frequency comparator 530 is applied.

The collector-emitted path of transistor Q2 is in shunt with a storage capacitor C1 which charges through the constant current source when the transistor Q3 is nonconductive and discharges when the latter is biased conductive in response to the respective sync pulse. The voltage developed across the capacitor C1 biases a transistor Q3 which is in series with a resistor R2, forming a buffer amplifier. Voltages developed across resistors R2V and R2H are applied through coupling capacitors C2V and C2H to deflection yokes 2 and 3 respectively.

Manually operated mode select switches 63V and 63H are ganged with switch 61. The read terminals R of switches 63V and 63H are coupled together to the output of phase comparator 532 and the write terminals W are impressed with beam centering reference voltages from voltage sources 64V and 64H, respectively. Each of the switches 63 has a moving contact arm which is coupled by a resistor R3 to the associated deflection yoke.

During write operation, switches 521, 61, 63V, 63H are turned to the write position W. The constant current source transistors Q1V and Q1H are biased at a reference potential to generate vertical and horizontal reference sweep voltages. The vertical and horizontal yokes are respectively impressed with the reference sweep voltages which are respectively summed with beam centering reference potentials which are determined so that the electron beam is exactly centered on the target. The target is then illuminated with a radiation of a predetermined color in the same manner as in the previous embodiment to generate a reference video signal which is calibrated by the reference potentials just mentioned and applied through band-pass filter 13 and through switch 521 to AD converter 522 and stored into the field memory at a constant rate determined by the oscillator 525 frequency.

During readout operations, the transistors Q1V and Q1H of the deflection circuit 510 are biased with an error voltage supplied from the frequency comparator 530 so that the vertical and horizontal sweep waveforms are adjusted in a direction tending to compensate for any variations in the deflection waveforms. The phase error signal from the comparator 532 is applied to the yokes 2 and 3 to compensate for beam's deviation from the calibrated center position.

Figure 7:
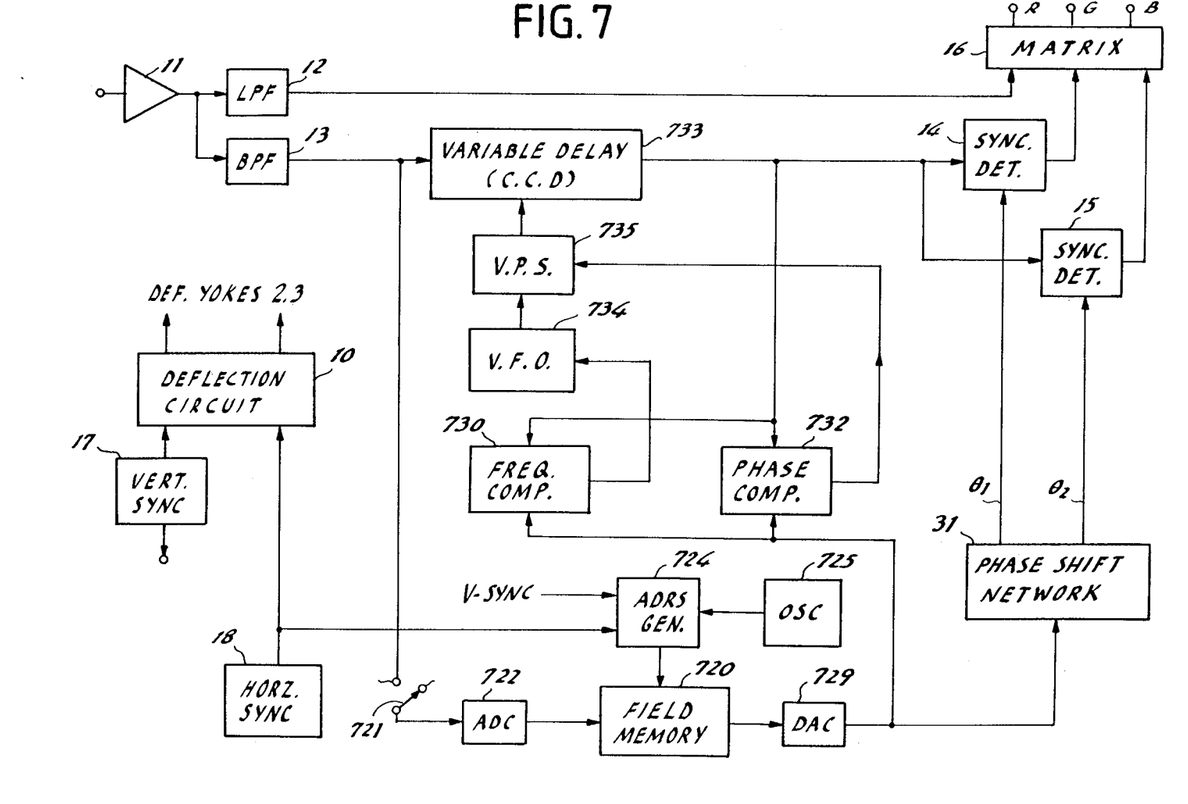
FIG. 7 is a block diagram of a third preferred embodiment of the present invention.

FIG. 7 is an illustration of a third preferred embodiment of the invention. This embodiment employs a variable delay line for effecting the frequency and phase match. A charge-coupled device 733 is preferably employed as the variable delay line. The device 733 is connected in a circuit between the band-pass filter 13 and synchronous detectors 14, 15. The delay time to be introduced to the video signal by the delay line 733 is controlled by a circuit including a variable frequency oscillator 734 an a variable phase shifter 735 which is connected between the output of the oscillator 734 and a delay control input of the delay line 733.

Frequency comparator 730 provides the detection of a frequency deviation of the output of variable delay line 733 with respect to the output signal of DA converter 729 and applies its output to the frequency control terminal of variable frequency oscillator 734. Similarly, phase comparator 732 provides the detection of a phase deviation of the output of the delay line 733 with respect to the DA converter 729 output and applies its output to the phase control terminal of variable phase shifter 735.

With mode select switch 721 being switched to the write position W, the reference color video signal is digitized at AD converter 722 and written into field memory 720 under the control of address generator 724 and oscillator 725 in the same manner as described in the previous embodiments. During readout modes, the delayed color signal is compared in the frequency and phase comparators 730 and 732 with the reference signal from the DA converters 729 to control the frequency and phase of the variable delay line 733 so that both frequency and phase differences reduce to zero.

Figure 8:
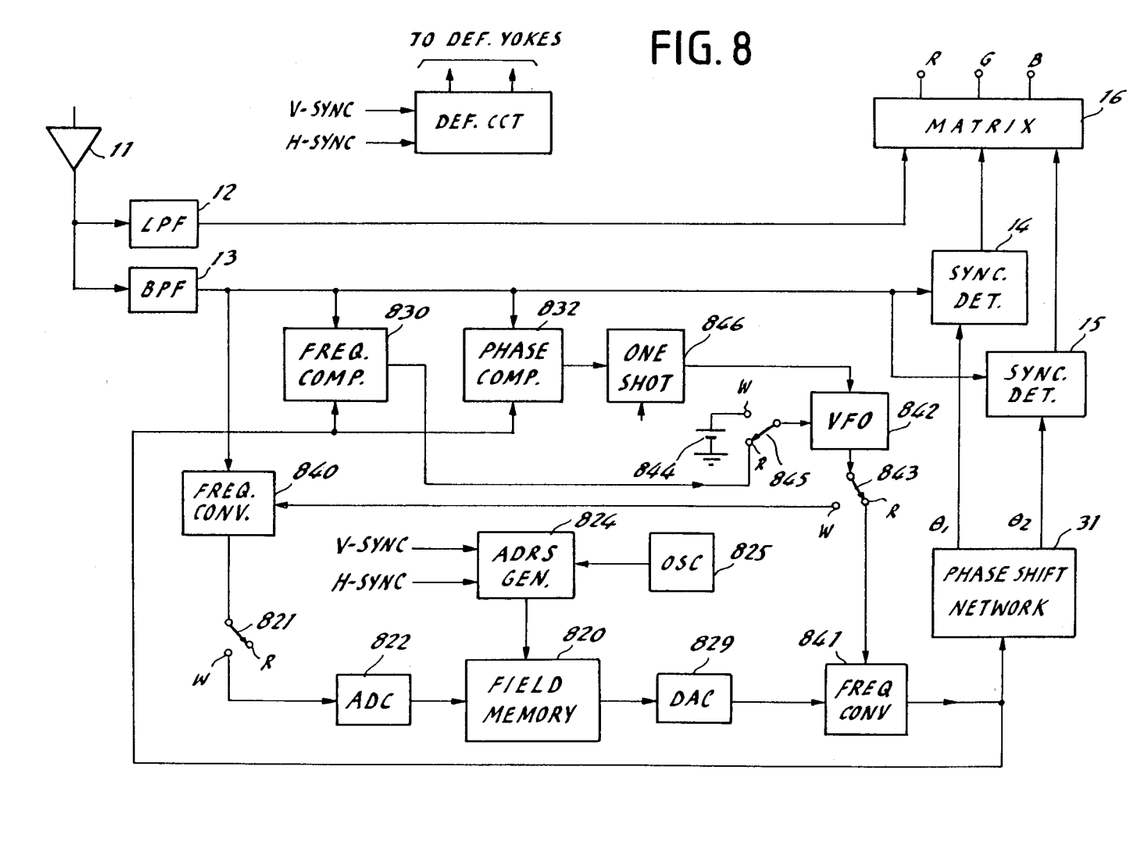
FIG. 8 is a block diagram of a fourth preferred embodiment of the present invention.

A fourth embodiment of the present invention is shown in FIG. 8 in which frequency converters 840 and 841 are connected to the input of AD converter 822 and to the output of DA converter 829, respectively. Frequency converter 840 functions to reduce the frequency of the reference video signal by mixing it with a carrier supplied from a variable frequency oscillator 842 through the write position of a mode select switch 843, while frequency converter 841 functions to reconvert the frequency of the signal from DA converter 829 to the original frequency by mixing it with the oscillator 842 output supplied through the read position of switch 843.

During a write-in mode, the variable frequency oscillator 842, which preferably comprises a resettable voltage-controlled oscillator, is impressed with a reference voltage from a source 844 through the write position of a mode select switch 845 to supply the carrier at a constant frequency to the frequency converter 840. The reference color signal is converted to a low frequency signal and fed through the write position of switch 821 to AD converter 822. This frequency conversion eliminates the redundant information associated with the high spatial frequency of the color filter 4 in comparison with the amount of information necessary to effect the nonlinearity compensation. The field memory 820 is thus only needed to store a smaller amount of information than is required in the previous embodiments. Under the control of address generator 824 and oscillator 825, the digitized reference video signal is stored into the memory 820.

During a readout mode, the variable frequency oscillator 842 is supplied with a frequency control potential from the output of frequency comparator 830 which derives it by comparing the band-pass filter 13 output with the output of frequency converter 841 to which the output of oscillator 842 is supplied. By feedback operation, the variable frequency oscillator 842 is controlled so that the frequency difference is reduced to zero. The frequency match is supplemented by phase comparator 832 which detects a phase deviation of the video signal from the reference frequency signal delivered from the frequency converter 841. The output of phase comparator 832 is fed to a one-shot multivibrator 846 to which is also applied the horizontal sync pulse. This horizontal sync resets the one-shot multivibrator into a low output state to allow it to switch to a high output state when the threshold level of the one-shot multivibrator is exceeded by the output of phase comparator 832. The positive transition of the output of one-shot multivibrator 846 resets the resettable voltage-controlled oscillator 841 at such timing that the output of phase comparator 832 reduces to zero. Thus, the reference frequency fed to the frequency converter 841 and hence its output signal matches in frequency and phase with the video signals supplied to the synchronous detectors 14 and 15, cancelling the deflection system's instabilities.

Figure 9:
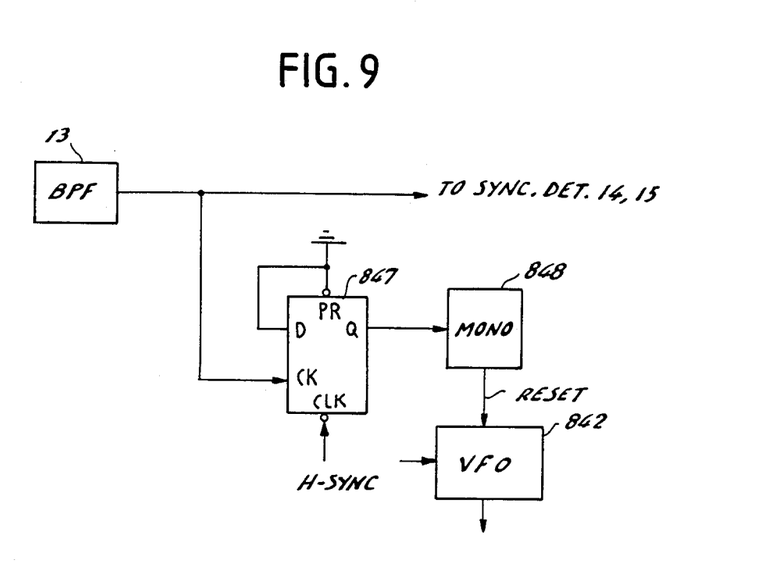
FIG. 9 is a circuit diagram of an alternative form of the phase detector of FIG. 8.

In the embodiment of FIG. 8, the phase match is continued by monitoring the phase difference during each line scan period in accordance with the phase error detected by phase comparator 832. An alternative method for effecting the phase match is shown in FIG. 9 in which the phase comparator 832 and one-shot multivibrator 846 are replaced with a D-type flip-flop 847 having the data input D and preset terminal PR being grounded. The flip-flop 847 takes its clock input from the output of band-pass filter 13 and its clear input from the horizontal sync generator. The Q output of flip-flop 847 switches to a high voltage level in response to the leading edge of the video output that occurs at each line scan and switches to a low voltage level in response to each horizontal sync pulse. The high level signal is received by a monostable multivibrator 848 to generate a short duration reset pulse which is applied to the resettable voltage-controlled oscillator 842. In this alternative method, the oscillator 842 is reset to a predetermined phase at the beginning of each horizontal scan period and thereafter maintains this phase condition until the end of the line scan.

Figure 10:
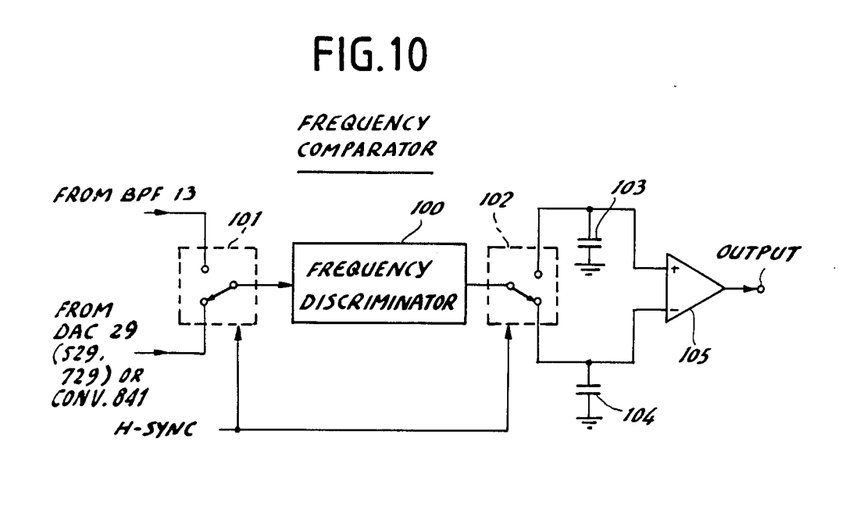
FIG. 10 is a circuit diagram of a preferred form of the frequency comparator employed in the first to fourth embodiments.

FIG. 10 shows a preferred form of the frequency comparator employed in the embodiments of FIGS. 1, 5, 7 and 8. The comparator comprises a frequency discriminator 100 which takes its input through an analog input switch 101 selectively from band-pass filter 13 or DA converter 29 (529, or 729 or frequency converter 841) and delivers its output through an analog output switch 102 to selectively a storage capacitor 103 or 104. The horizontal sync pulse is applied to the control terminals of switches 101 and 102 to switch the input to the frequency discriminator 100 between the band-pass filter 13 output and DA converter 29 output in response to the horizontal sync pulse and to switch the output of the discriminator between the storage capacitors 102 and 104 likewise in response to the horizontal sync pulse. The discriminator 100 outputs derived from the band-pass filter 13 and DA converter 29 are respectively stored in capacitors 103 and 104. The stored signals are applied to a voltage comparator 105 to detect the difference therebetween as an indication of the frequency difference between the color video signal and the reference video signal from the field memory.

Figure 11:
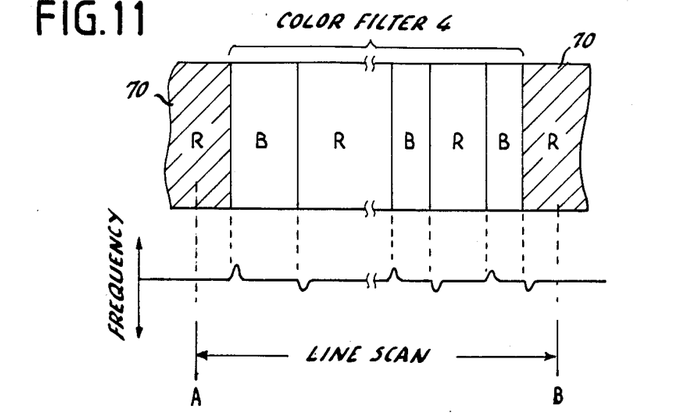
FIG. 11 is a schematic view explaining the general concept for cancelling undesirable frequency drift in the video signal.

In the previous embodiments it has been noted that when the electron beam encounters a transition from one color to another, there is a frequency variation in the video output. For example, with the color filter of the type shown in FIG. 3, the instantaneous frequency of the video signal increases at a transition from red to blue and it conversely decreases at a transition from blue to red. Such frequency variations can be compensated for by providing a light generating area of a given color on each side of the color filter 4 which is outside of the color filter but within the beam scanning range. FIG. 11 explains this concept. A portion of the color filter 4 is illuminated with a color image having an alternate pattern of blue and red bars. Adjacent to each vertical edge of the filter 4 is a red color passing region 70. As the beam is scanned from point A to point B, the video output frequency momentarily rises and falls at equal number of transitions from red to blue and from blue to red (three rises and three falls), so that the total frequency drift is nullified. Examination of FIG. 11 will reveal that the cancellation effect occurs in any permutation of red and blue colors.

Figure 12:
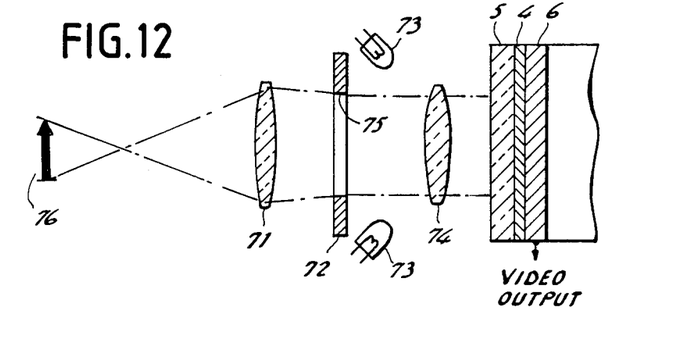
FIG. 12 is a preferred arrangement of the pickup tube associated with FIG. 11.

FIG. 12 shows a preferred form of the image pickup tube 1. In front of the faceplate 5 of the pickup tube is provided an object lens 71 for focusing an object 76, an aperture plate 72, bias light sources 73 and a relay lens 74. The aperture plate 72 is formed with a rectangular aperture 75 which defines the area in which light rays from the object 76 are allowed to fall. Outside of this area is masked by the aperture plate 72.

Figure 13:
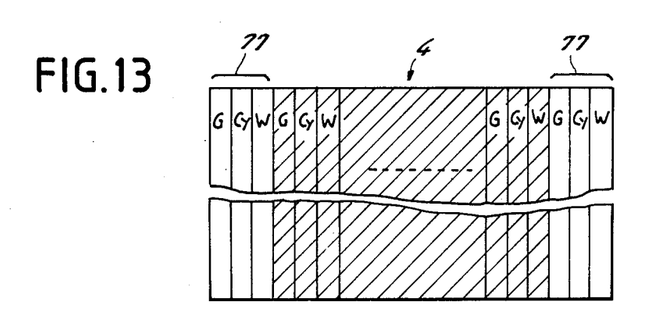
FIGS. 13-15 are illustrations of modified color filters and a modified target structure to be employed with the arrangement of FIG. 12.

As shown in FIG. 13, the image is focused on the shaded area. Frequency drift compensating means 77 are provided by two groups of color filter stripes which are green, cyan and transparent. The color filter is masked by the aperture plate 72, and illuminated with bias light of a predetermined color from the light sources 73, so that they cause a constant-amplitude signal of a predetermined frequency and phase to be generated at the beginning and end of the line scan.

Figure 14:
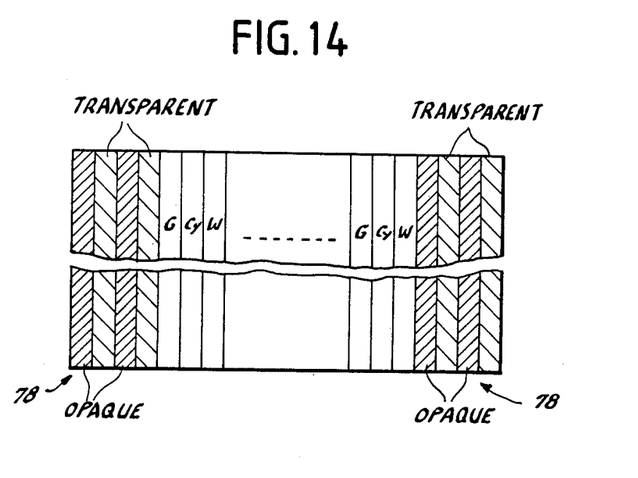

Another form of the frequency drift compensating means comprises identical patterns 78 of opaque and transparent stripes as shown in FIG. 14, which areas are illuminated by the bias light sources in the arrangement of FIG. 12.

Figure 15:
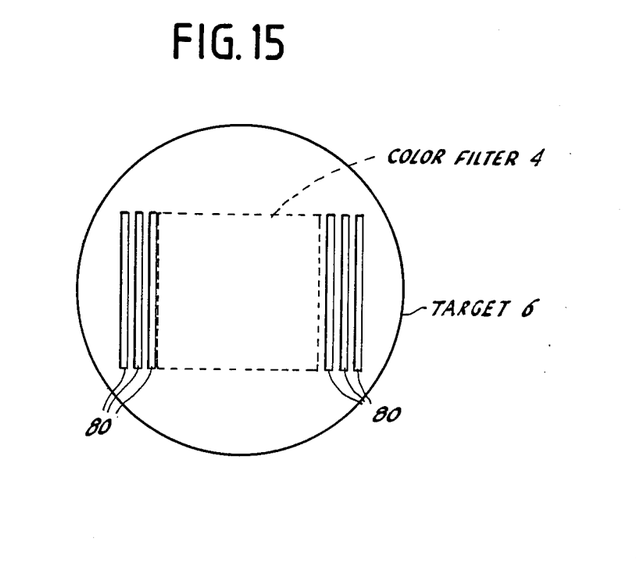

Such opaque and transparent patterns may be provided by an equal number of parallel slits 80 formed in the photoconductive film (Nesa film) of the target 6 at opposite sides of the color filter 4 as shown in FIG. 15. The slitted portions of the photoconductive film causes burst pulses to occur at each end of the line scan with a frequency corresponding to the spatial frequency of the slitted portions and a predetermined phase with respect to the video signal that occurs in the period between the two bursts.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A color imaging apparatus wherein a color image is focused on a photoelectrical conversion target of a color image pickup tube through a color stripe filter and converted to an electrostatic image which is scanned in raster form by an electron beam under the control of a deflection system in response to horizontal and vertical sync pulses to generate a video signal from said photoelectrical conversion target, said color stripe filter comprising a plurality of recurrent groups of different color stripes successively arranged at periodic intervals so that said video signal has a frequency inversely proportional to the intervals at which said recurrent groups are arranged, said video signal varying in phase with the relative values of primary color components contained in the color image passing through the stripes of each group and in amplitude with the intensity of said primary color components, comprising:

a field memory;

reading and writing means for writing into the memory, during a write mode, a reference video signal derived from said target when the target is uniformly illuminated by light of a predetermined color passing through said color filter, wherein the frequency of the reference video signal varies as a function of inherent nonlinearity of the deflection system, and for repeatedly reading the reference video signal from the memory during a read mode to generate a reference frequency signal;

control means including a frequency comparator for detecting a frequency difference between said reference frequency signal and said video signal for controlling the frequency relationship between said reference frequency signal and said video signal in response to the detected frequency difference so that the frequency difference reduces towards zero; and detector means for deriving a pair of color video components from the frequency-controlled video signal and reference frequency signal.

2. Apparatus as claimed in claim 1, wherein said control means comprises a variable frequency oscillator for generating clock pulses the frequency of which is variable as a function of the detected frequency difference and address means for reading said reference video signal from said memory in response to said variable frequency clock pulses.

3. Apparatus as claimed in claim 2, wherein said control means further comprises means for detecting the leading edge of the video signal at each line scan and resetting said variable frequency oscillator to a predetermined phase to bring the clock pulses into phase with said video signal.

4. Apparatus as claimed in claim 2, wherein said variable frequency oscillator is supplied with a reference voltage during said write mode to set the frequency of said variable frequency clock pulses at a predetermined frequency value for causing said address means to write said reference video signal into said memory at a constant rate.

5. Apparatus as claimed in claim 1, wherein said control means comprises means for controlling the amplitude of a sawtooth waveform generated by said deflection system as a function of the detected frequency difference.

6. Apparatus as claimed in claim 5, further comprising a phase comparator for generating a phase difference signal representing the phase difference between said reference frequency signal and said video signal and combining the phase difference signal with said sawtooth waveform.

7. Apparatus as claimed in claim 5, further comprising a first reference voltage source for setting said amplitude controlling means to a predetermined voltage during the write mode and a second reference voltage source for centering said electron beam in relation to said target during the write mode.

8. Apparatus as claimed in claim 1, wherein said control means comprises a variable delay circuit for introducing a delay time to said video signal as a function of the detected frequency difference, and wherein said detector means comprises:
  a phase shifter for shifting the phase of an output signal from said memory by predetermined amounts and generating a pair of phase-shifted reference signals; and
  a pair of synchronous detectors each having a first input terminal responsive to an output signal from said variable delay circuit and a second input terminal, the second input terminals of said synchronous detectors being responsive to said phase-shifted reference signals, respectively.

9. Apparatus as claimed in claim 8, further comprising a phase comparator for detecting a phase difference between said reference frequency signal and the delayed video signal and controlling the phase of the video signal in accordance with the detected phase difference.

10. Apparatus as claimed in claim 9, wherein said variable delay circuit comprises a charge transfer device, a variable frequency oscillator for driving said charge transfer device at a frequency which is a function of said detected frequency difference and a variable phase shifter for shifting the phase of said oscillator in accordance with said detected phase difference.

11. Apparatus as claimed in claim 1, wherein said control means comprises frequency converter means for converting said reference frequency signal before being written into said memory to a lower frequency reference video signal during said write mode and means for establishing, in accordance with the detected frequency difference, an equal frequency relationship between said video signal and said reference frequency signal corresponding to said lower frequency reference video signal read from said memory during said read mode.

12. Apparatus as claimed in claim 11, wherein said frequency converter means comprises:
  a first frequency converter for converting said reference video signal before being written into said memory to said lower frequency reference video signal during said write mode;
  a second frequency converter for converting said lower frequency reference video signal to said reference frequency signal so that said reference frequency signal has the same frequency as said reference video signal during said read mode;
  a phase shifter for shifting the phase of said reference frequency signal and generating a pair of phase-shifted reference signals; and
  a pair of synchronous detectors each having a first input terminal responsive to said video signal and a second input terminal responsive to one of said phase-shifted reference signals.

13. Apparatus as claimed in claim 12, wherein said control means further comprises a phase comparator for detecting the phase difference between said video signal and the output signal from said second frequency converter and means for controlling the phase of said second frequency converter in accordance with the detected phase difference.

14. Apparatus as claimed in claim 1, wherein said frequency comparator comprises a frequency discriminator, a switching circuit for selectively applying said video signal and said reference frequency signal to the input terinal of said frequency discriminator at regular intervals and delivering the output signal of said frequency discriminator to first and second storage means synchronously with the selective application of said video and reference frequency signals to the input terminal, and a comparator for detecting the difference between the voltages stored in said first and second storage means as said frequency difference.

15. Apparatus as claimed in claim 1, wherein said pickup tube comprises frequency-drift compensating means including a first striped portion extending along one edge of a specified area of said target and a second striped portion extending along the opposite edge of said specified area, said first and second portions being scanned by the electron beam at the beginning and end of each of a plurality of scanning lines for generating a signal having a frequency variation of a given sense in response to said first striped portion being scanned by said beam and a signal having a frequency variation opposite to said given sense in response to said second striped portion being scanned by said beam.

16. Apparatus as claimed in claim 15, wherein each of said first and second striped portions is illuminated by bias light.

17. Apparatus as claimed in claim 15, wherein each of said first and second striped portions comprises a pattern of alternate opaque and transparent stripes.

18. Apparatus as claimed in claim 17, wherein said opaque and transparent stripes are formed by an opaque member having parallel slits, said opaque member being disposed on the photoelectrical conversion target.

19. Apparatus as claimed in claim 1, wherein said control means comprises a phase comparator for generating a phase difference signal representative of the phase difference between said reference frequency signal and said video signal and means for controlling the phase relationship between said reference frequency signal and said video signal in response to said phase difference signal so that said phase difference reduces towards zero.

\* \* \* \* \*